US008874171B2

(12) United States Patent
Matada et al.

(10) Patent No.: US 8,874,171 B2
(45) Date of Patent: *Oct. 28, 2014

(54) SUPPORTING MULTIPLE SUBSCRIBER IDENTITIES IN A PORTABLE DEVICE USING A SINGLE TRANSCEIVER

(75) Inventors: Sandeep K. Matada, Bangalore (IN); Victor S. Moore, Lake City, FL (US); Dhandapani Shanmugam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 13/433,887

(22) Filed: Mar. 29, 2012

(65) Prior Publication Data

US 2012/0196610 A1 Aug. 2, 2012

Related U.S. Application Data

(63) Continuation of application No. 12/943,051, filed on Nov. 10, 2010, now Pat. No. 8,351,981.

(51) Int. Cl.
*H04B 1/38* (2006.01)
*H04W 72/04* (2009.01)
*H04W 8/26* (2009.01)
*H04W 88/06* (2009.01)

(52) U.S. Cl.
CPC .............. *H04W 72/048* (2013.01); *H04W 8/26* (2013.01); *H04W 88/06* (2013.01)
USPC ...................... 455/558; 455/552.1; 455/550.1; 370/342

(58) Field of Classification Search
CPC . H04B 1/707; H04B 1/3816; H04M 1/72519; H04W 88/06
USPC ...................... 455/558, 552.1, 550.1; 370/342
See application file for complete search history.

(56) References Cited

U.S. PATENT DOCUMENTS 6,400,699 B1 * 6/2002 Airy et al. ...................... 370/329
6,556,820 B1   4/2003 Le et al.
(Continued)

FOREIGN PATENT DOCUMENTS

WO    2007012881    2/2007

OTHER PUBLICATIONS

Ari Ahtiainen et al., Multiradio Scheduling and Resource Sharing on a Software Defined Radio Computing Platform, Proceedings of the SDR '08 Technical Conference and Product Exposition, 2008.

(Continued)

*Primary Examiner* — Danh Le
(74) *Attorney, Agent, or Firm* — James L. Baudino

(57) ABSTRACT

According to one aspect of the present disclosure, a method and technique for enabling wireless communications for multiple numbers or subscriber identities using a single transceiver is disclosed. The method includes, for a terminal device including a transceiver for wireless communications, determining whether the terminal device supports a plurality of subscriber identities. The method also includes, responsive to determining that the terminal device supports a plurality of subscriber identities, creating a plurality of recurrent time slots for a communication channel of the terminal device, allocating for each subscriber identity a respective time slot, and enabling wireless communications for the plurality of subscriber identities using the respective time slots via the transceiver.

14 Claims, 4 Drawing Sheets

(56) References Cited

U.S. PATENT DOCUMENTS

| | | | |
|---|---|---|---|
| 7,505,769 B2 | 3/2009 | Jiang | |
| 7,613,480 B2 | 11/2009 | Brown | |
| 2002/0142780 A1* | 10/2002 | Airy et al. | 455/452 |
| 2007/0105531 A1 | 5/2007 | Schroeder, Jr. | |
| 2007/0213050 A1 | 9/2007 | Jiang | |
| 2008/0144567 A1* | 6/2008 | Agami et al. | 370/329 |
| 2009/0149220 A1 | 6/2009 | Camilleri et al. | |
| 2009/0215473 A1* | 8/2009 | Hsu | 455/458 |
| 2012/0062406 A1* | 3/2012 | Cho et al. | 341/156 |

OTHER PUBLICATIONS

Yogesh Patel, Four Phone Numbers in One SIM through iSIM, Internet website post, Apr. 19, 2010.

Realwire, Roaming Charges Abolished in USA Using a Multi Number Global SIM Card, Internet website press release, Jul. 30, 2009.

WorldSIM, Introducing WorldSIM MultiIMSI Sim Card, Internet website post, 2010.

WorldSIM; WorldSIM Launch Multi IMSI SIM Card with both UK (+44) and USA (+1) Numbers at GITEX; Internet website (http://www.symbianone.com/content/view/6537/30/): Oct. 12, 2009.

\* cited by examiner

SUPPORTING MULTIPLE SUBSCRIBER IDENTITIES IN A PORTABLE DEVICE USING A SINGLE TRANSCEIVER

BACKGROUND

Wireless communication devices, such as cellular phones, personal digital assistants, smart phones, etc., are a convenient means to stay connected with different people (e.g., family, friends, business acquaintances, etc.). However, users of such devices generally prefer to have different telephone numbers for different purposes (e.g., business versus personal). A telephone number is generally considered a unique subscriber identity. The subscriber identity may be defined in a subscriber identity module (SIM) card in such a device, and a transceiver (i.e., a receiver/transmitter module) is provided to support wireless communications for the SIM. Thus, to enable multiple telephone numbers to be supported in a single device, the device may include a distinct SIM card for each distinct telephone number and multiple transceivers (e.g., one transceiver for each SIM card).

BRIEF SUMMARY

According to one aspect of the present disclosure, a method and technique for enabling wireless communications for multiple numbers or subscriber identities using a single transceiver is disclosed. The method includes, for a terminal device including a transceiver for wireless communications, determining whether the terminal device supports a plurality of subscriber identities. The method also includes, responsive to determining that the terminal device supports a plurality of subscriber identities, creating a plurality of recurrent time slots for a communication channel of the terminal device, allocating for each subscriber identity a respective time slot, and enabling wireless communications for the plurality of subscriber identities using the respective time slots via the transceiver.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
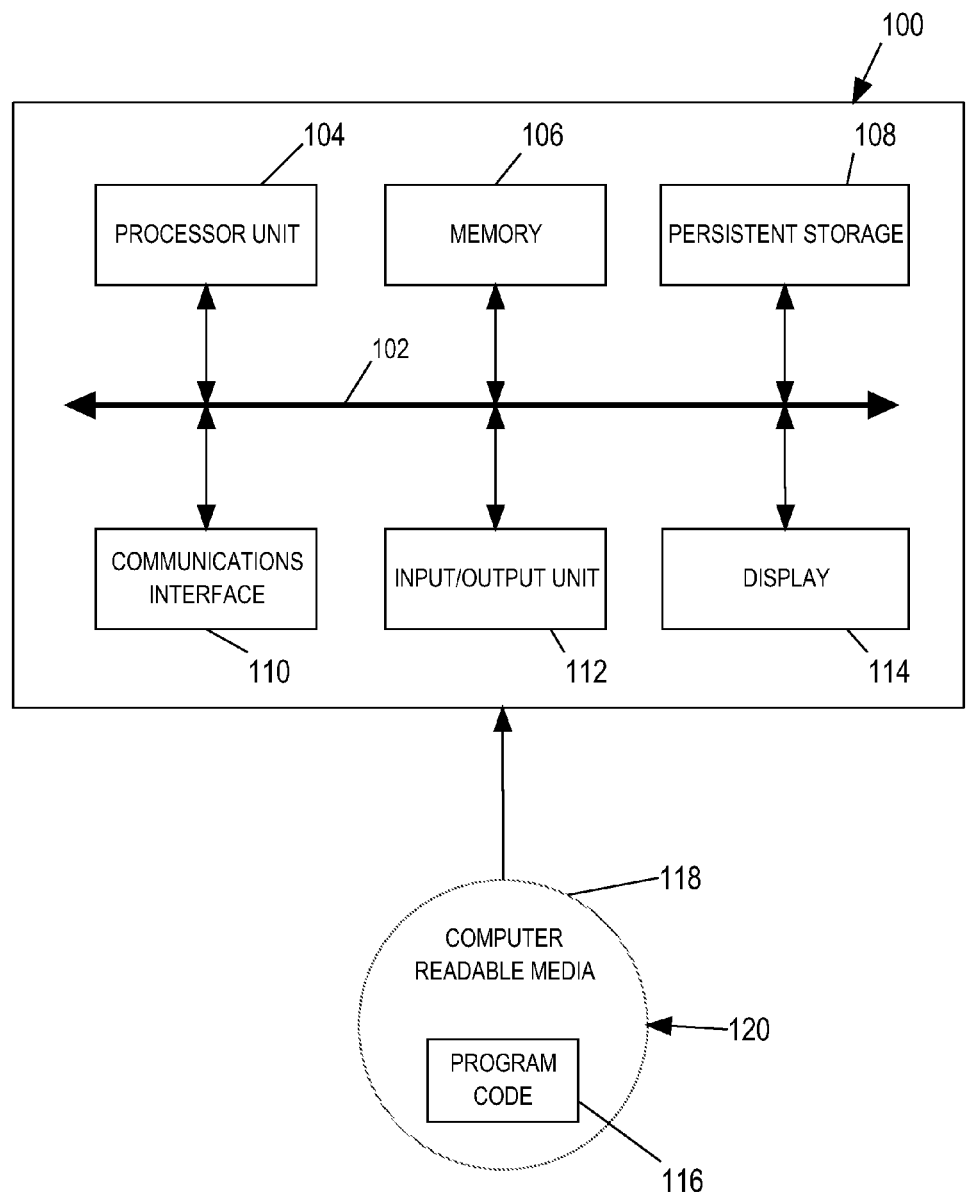
FIG. 1 is an embodiment of a data processing system in which the illustrative embodiments of the present disclosure may be implemented.

Embodiments of the present disclosure provide a method, system and computer program product for enabling wireless communications for multiple numbers or subscriber identities on a terminal device using a single transceiver. The method includes, for a terminal device including a transceiver for wireless communications, determining whether the terminal device supports a plurality of subscriber identities, such as whether the device includes a plurality of subscriber identity modules (SIMs) each having associated therewith a unique subscriber identity. The method also includes, responsive to determining that the terminal device supports a plurality of subscriber identities, creating a plurality of recurrent time slots for an internal communication channel of the terminal device, allocating for each subscriber identity a respective time slot, and enabling wireless communications for the plurality of subscriber identities using the respective internal communication channel time slots via the transceiver.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the Figures and in particular with reference to FIG. 1, an exemplary diagram of data processing system for a terminal device 100 is provided in which illustrative embodiments of the present disclosure may be implemented. It should be appreciated that FIG. 1 is only exemplary and is not intended to assert or imply any limitation with regard to the environments in which different embodiments may be implemented. Many modifications to the depicted environments may be made. Terminal device 100 includes a bus or communications fabric 102, which provides communications between processor unit 104, memory 106, persistent storage 108, communications interface 110, input/output (I/O) unit 112, and display 114. Terminal device 100 may include, but is not limited to, a cellular phone, smart phone, personal digital assistant (PDA), or other type of portable and/or mobile communications device having wireless capabilities.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

In some embodiments, memory 106 may be a random access memory or any other suitable volatile or non-volatile storage device. Memory 106 may include ROM, RAM, PROM, EPROM, smart card, subscriber identity modules (SIMs), wireless multimedia and messaging service modules (WIMs) or any other medium from which a computing device can read executable instructions or a computer program. Persistent storage 108 may contain one or more components or devices. Persistent storage 108 may be a hard drive, a flash memory, a rewritable optical disk, a rewritable magnetic tape, or some combination of the above. The media used by persistent storage 108 also may be removable such as, but not limited to, a removable hard drive.

Communications interface 110 provides for two-way communications with other data processing systems or devices. Communications interface 110 may include, but is not limited to, a digital subscriber line (DSL) card or modem, an integrated services digital network (ISDN) card, a cable modem, or a telephone modem to provide data communication connection to a corresponding type of telephone line. As another example, communications interface 110 may be a local area network (LAN) card. Further, communications interface 110 may include peripheral interface devices, such as a Universal Serial Bus (USB) interface, a Personal Computer Memory Card International Association (PCMCIA) interface, and the like. Communications interface 110 also enables the exchange of information across one or more wireless communication networks. Such networks may include cellular or short-range such as IEEE 802.11 wireless local area networks (WLANs) and the exchange of information involving the transmission of radio frequency (RF) signals through an antenna.

Input/output unit 112 enables input and output of data with other devices that may be connected to terminal device 100. In some embodiments, input/output unit 112 may provide a connection for user input through a keypad, keyboard, trackpad, mouse or other device. Further, input/output unit 112 may send output to a printer or other type of output device. Display 114 provides a mechanism to display information to a user.

Instructions for the operating system and applications or programs for terminal device 100 are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to terminal device 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to terminal device 100. The tangible form of computer readable media 118 is also referred to as computer recordable storage media. In some instances, computer readable media 118 may not be removable.

Alternatively, program code 116 may be transferred to terminal device 100 from computer readable media 118 through a communications link to communications interface 110 and/or through a connection to input/output unit 112. The communications link and/or the connection may be physical or wireless in the illustrative examples.

The different components illustrated for terminal device 100 are not meant to provide architectural limitations to the manner in which different embodiments may be implemented. The different illustrative embodiments may be implemented in a data processing system including components in addition to or in place of those illustrated for terminal device 100. Other components shown in FIG. 1 can be varied from the illustrative examples shown. For example, a storage device in terminal device 100 is any hardware apparatus that may store data. Memory 106, persistent storage 108, and computer readable media 118 are examples of storage devices in a tangible form.

Figure 2:
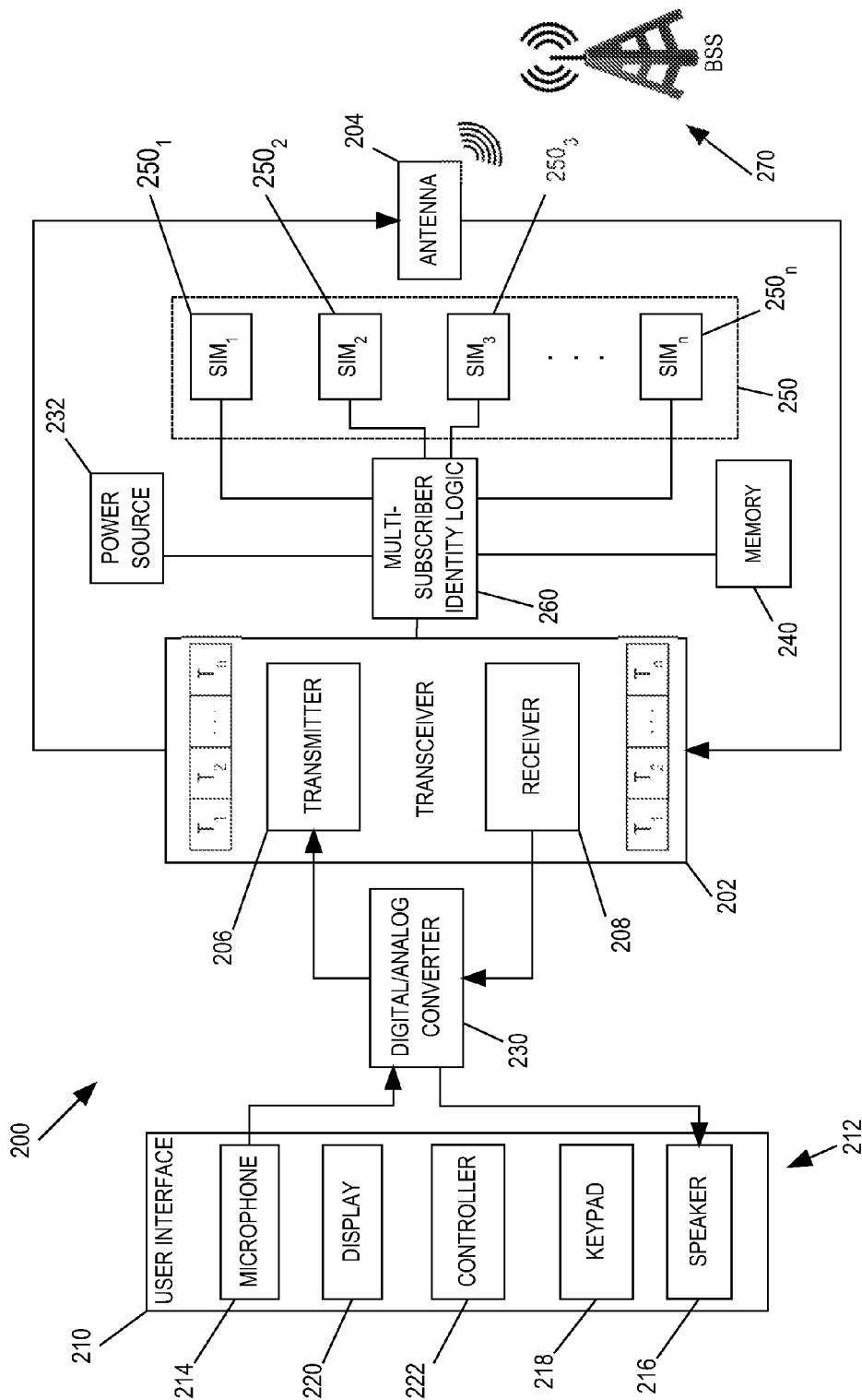
FIG. 2 is a diagram illustrating an embodiment of a data processing system in which illustrative embodiments of a terminal device of the present disclosure may be implemented.

FIG. 2 is an illustrative embodiment of a data processing system 200 to support communications for multiple subscriber identities using a single transceiver. System 200 may be implemented on a data processing system or platform such as, but not limited to, terminal device 100. In the embodiment illustrated in FIG. 2, system 200 comprises a transceiver 202 coupled to an antenna assembly 204 for enabling two-way wireless communications. In the illustrated embodiment, transceiver 202 includes a transmitter 206 and a receiver 208 for transmitting and receiving wireless communications, respectively, via antenna assembly 204. In FIG. 2, system 200 also includes a user interface 210 various types in input/output units 212 such as, but not limited to, a microphone 214 and a speaker 216 for inputting and outputting audio signals, respectively, and a keypad 218. System 200 also includes a 220 display for visually displaying various types of information to a user of system 200. A controller 222 is provided for enabling the control of various features of system 200 and/or terminal device 100. For example, controller 222 may serve to execute instructions for software that may be loaded into a memory. Controller 222 may include a set of one or more processors or may be a multi-processor core, depending on the particular implementation. Further, controller 222 may be implemented using one or more heterogeneous processor systems in which a main processor is present with secondary processors on a single chip. Controller 222 may also comprise hardware, software, firmware, or a combination thereof. For example, controller 222 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system) such as, but not limited to, launching and interfacing with various program applications, initiating and/or responding to a call on terminal device 100, managing and/or controlling operation of transceiver 202 and other components of system 200.

In the embodiment illustrated in FIG. 2, system 200 further includes a digital/analog converter 230 for converting analog signals to digital signals, and vice versa, a power source 232 for providing power to the various components of system 200, and a memory 240. Memory 240 may be a random access memory or any other suitable volatile or non-volatile storage device from which a computing device and/or processor unit can read executable instructions or a computer program (e.g., such as controller 222). In FIG. 2, system 200 includes one or more SIMs 250 (identified as SIMs $250_1$-$250_n$ in FIG. 2) each defining and/or having associated therewith one or more unique subscriber identities (i.e., a unique telephone number). For example, each SIM 250 may define a single subscriber identity (e.g., resulting in multiple SIMs 250 to define multiple telephone numbers), or a single SIM 250 may be used to define a plurality of unique subscriber identities. It should also be understood that unique subscriber identities may be otherwise defined in system 200, such as using other types of cards or modules. In FIG. 2, system 200 also includes multi-subscriber identity logic 260. Multi-subscriber identity logic 260 enables two-way wireless communications by terminal device 100 (e.g., with a base station server (BSS) 270 of a wireless communications network) for multiple subscriber identities using a single transceiver. Multi-subscriber identity logic 260 may comprise hardware, software, firmware, or a combination thereof. For example, multi-subscriber identity logic 260 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In operation, multi-subscriber identity logic 260 utilizes time division multiplexing to divide the internal transceiver (receiver/transmitter) communication channels of terminal device 100 (e.g., a control channel and a data channel) into a plurality of recurrent time slots such that each subscriber identity is allocated a separate and distinct time slot. For ease of illustration, consider that each SIM $250_{1-n}$ defines and/or otherwise has associated therewith a single subscriber identity, thereby resulting in multiple SIMs 250 to support multiple telephone numbers. In some embodiments, the internal receiver and transmitter communication channels are equally divided among the quantity of SIMs $250_{1-n}$ located or disposed in terminal device 100. In FIG. 2, the division of the internal receiver and transmitter communication channels is represented by the designations $T_1$-$T_n$. Thus, in some embodiments, multi-subscriber identity logic 260 determines a quantity of subscriber identities supported by device 100 (e.g., by determining a quantity of SIMs 250 residing in terminal device 100 or otherwise identifying the different unique subscriber identities supported by device 100) and divides the internal receiver and transmitter communication channels of terminal device 100 into a corresponding quantity of recurrent time slots such that each subscriber identity (e.g., each SIM $250_{1-n}$) is assigned to or allocated one of the recurrent time slots. Multi-subscriber identity logic 260 also controls and/or otherwise instructs transceiver 202 to communicate for a particular SIM 250 during its respective allocated time slot.

In some embodiments, the time slots allocated to respective SIMs $250_{1-n}$ are used internally when communicating externally to interface with a BSS or other network device (e.g., to register the particular SIM 250 with a network). As an illustrative example, time slot $T_1$ is allocated to SIM $250_1$. In response to powering on of terminal device 100 or another such time when use of wireless communication functions of terminal device is desired, multi-subscriber identity logic 260 determines a quantity of SIMs 250 residing on terminal device 100 and gathers information from each SIM 250. For example, multi-subscriber identity logic 260 may read and/or otherwise identify a frequency band of interest for each subscriber identity, a system identification code (SID) programmed for each subscriber identity, or other information associated with a particular subscriber identity for registering and/or otherwise establishing wireless communications with a wireless network. During time slot $T_1$, multi-subscriber identity logic 260 instructs transceiver to listen for communications corresponding to SIM $250_1$'s frequency, transmit or relay a signal strength indication to a corresponding BSS, receive a SID from a BSS and compare the received SID with a programmed SID for SIM $250_1$, and/or otherwise perform handshake and cell registration operations with BSS to register SIM $250_1$ with the network. These operations are also performed by multi-subscriber identity logic 260 for the remaining subscriber identities (e.g., remaining SIMs $250_{2-n}$) during the time slots allocated to the respective SIMs 250. Multi-subscriber identity logic 260 will also perform keep-alive operations during the time slots allocated to the respective SIMs $250_{1-n}$ in response to a particular SIM 250 remaining idle for a predefined time period. For example, if communications and/or activity relative to SIM $250_1$ remain idle for a predefined time period, during the time slot $T_1$, multi-subscriber identity logic 260 will cause a keep-alive signal to be sent to the BSS corresponding to SIM $250_1$ to maintain the wireless connection for SIM $250_1$ in the network.

In some embodiments, multi-subscriber identity logic 260 may re-allocate time slots between SIMs $250_{1-n}$ depending on whether a call is initiated or received during the time slot allocated to the corresponding SIM 250. For example, if SIM $250_1$ is allocated time slot $T_1$ and a call is initiated or received for SIM $250_1$ during a time slot $T_3$ (e.g., a time slot allocated to SIM $250_3$), multi-subscriber identity logic 260 may re-allocate time slot $T_3$ to SIM $250_1$ and re-allocate the remaining time slots to the remaining other SIMs 250. However, it should also be understood that initiating and/or responding to a call for a particular SIM 250 may be otherwise processed corresponding to the current time slot and/or time slot allocated to the particular SIM 250.

Further, in some embodiments, in response to initiating and/or responding/accepting a call for a particular subscriber identity, multi-subscriber identity logic 260 is configured to indicate that other subscriber identities are busy and/or unavailable. For example, in response to initiating and/or responding/accepting a call for a particular SIM $250_1$, multi-subscriber identity logic 260 is configured to respond to any other call received by terminal device 100 corresponding to SIMs $250_{2-n}$ with a busy signal/indication. However, it should be understood that in some embodiments, multi-subscriber identity logic 260 may be configured to direct the received call corresponding to SIMs $250_{2-n}$ to voice-mail, enable a call waiting signal to be initiated by terminal device 100, enable a user to switch between received calls, or other function related to the received call.

Figure 3:
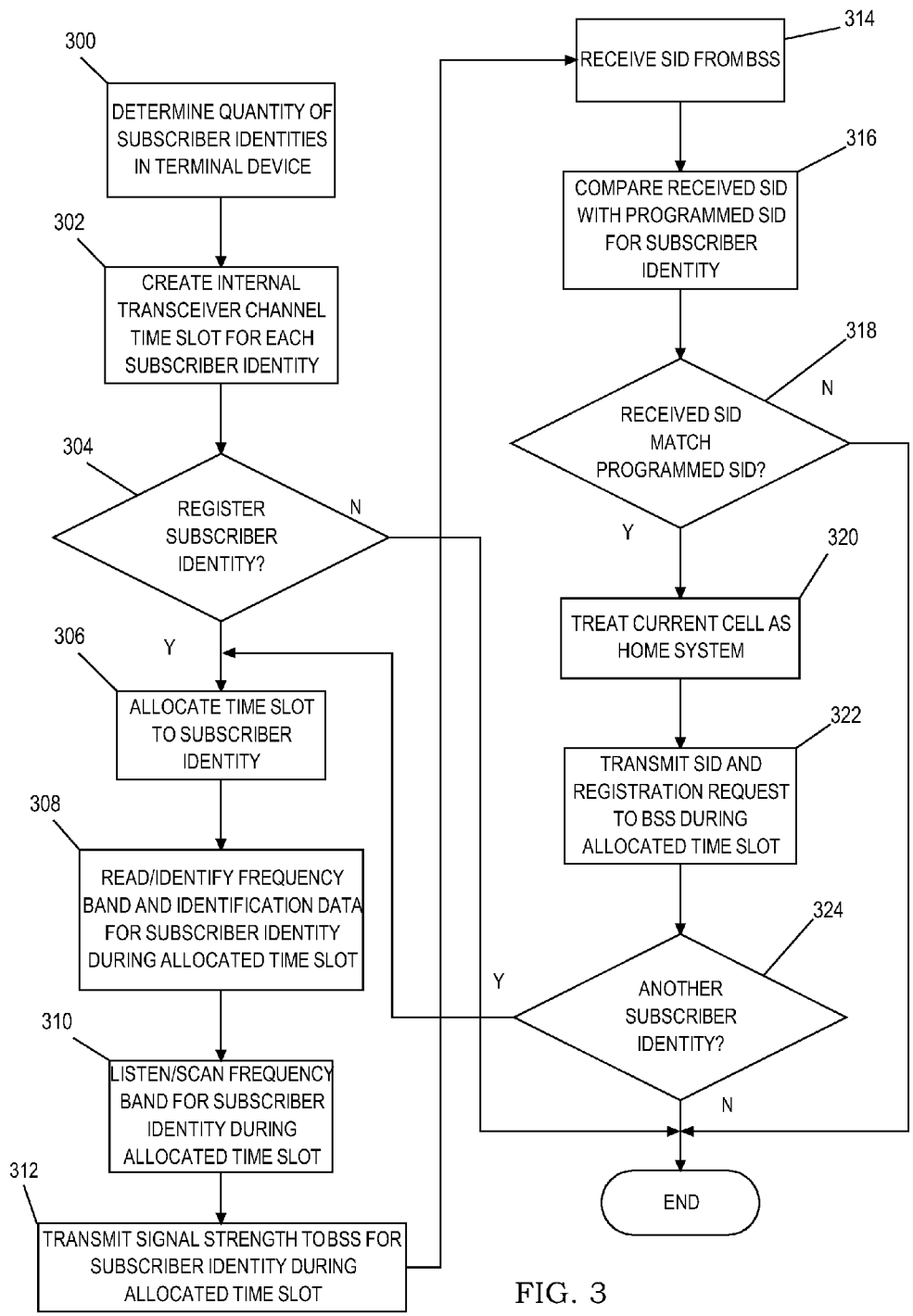
FIG. 3 is a flow diagram illustrating an embodiment of a method for enabling wireless communications for multiple subscriber identities using a single transceiver.

FIG. 3 is a flow diagram illustrating an embodiment of a method for enabling wireless communications for multiple subscriber identities via a single transceiver. The method begins at block 300, where multi-subscriber identity logic 260 determines the quantity of subscriber identities supported by terminal device 100. For example, in some embodiments, multi-subscriber identity logic 260 determines the quantity of SIMS 250 residing on terminal device 100 or the quantity of subscriber identities defined by one or more SIMs 250. At block 302, multi-subscriber identity logic 260 creates internal communication channel recurrent time slots for the identified subscriber identities. At decisional block 304, a determination is made whether a subscriber identity requires registration with a network. If not, the method proceeds to block 324. If so, the method proceeds to block 306, where one of the recurrent time slots is allocated to the subscriber identity. At block 308, during the allocated time slot, multi-subscriber identity logic 260 gathers, reads and/or otherwise obtains information for the subscriber identity (e.g., such as a frequency band corresponding to the subscriber identity). At block 310, during the allocated time slot, multi-subscriber identity logic 260 causes and/or otherwise instructs transceiver 202 to listen/scan the frequency band corresponding to the subscriber identity. At block 312, during the allocated time slot, multi-subscriber identity logic 260 causes and/or otherwise instructs transceiver 202 to transmit a signal strength to a BSS for the subscriber identity.

At block 314, multi-subscriber identity logic 260 receives a SID from the BSS corresponding to the subscriber identity. At block 316, multi-subscriber identity logic 260 compares the received SID with a SID programmed for the subscriber identity (e.g., as may be programmed in a particular SIM 250). At decisional block 318, a determination is made whether the received SID matches the programmed SID for the subscriber identity. If not, the method proceeds to block 324. If so, the method proceeds to block 320, where multi-subscriber identity logic 260 causes the current network cell to be treated as the home system for terminal device 100. At block 322, during the allocated time slot, multi-subscriber identity logic 260 causes and/or otherwise instructs transceiver 202 to transmit the SID and a registration request to the BSS for the subscriber identity. The BSS then registers the subscriber identity to the network system. At decisional block 324, a determination is made whether another subscriber identity requires registration. If so, the method returns to block 306 where the above-described process may be repeated for another subscriber identity (e.g., such for another SIM 250) using a different allocated time slot. If not, the method ends.

Figure 4:
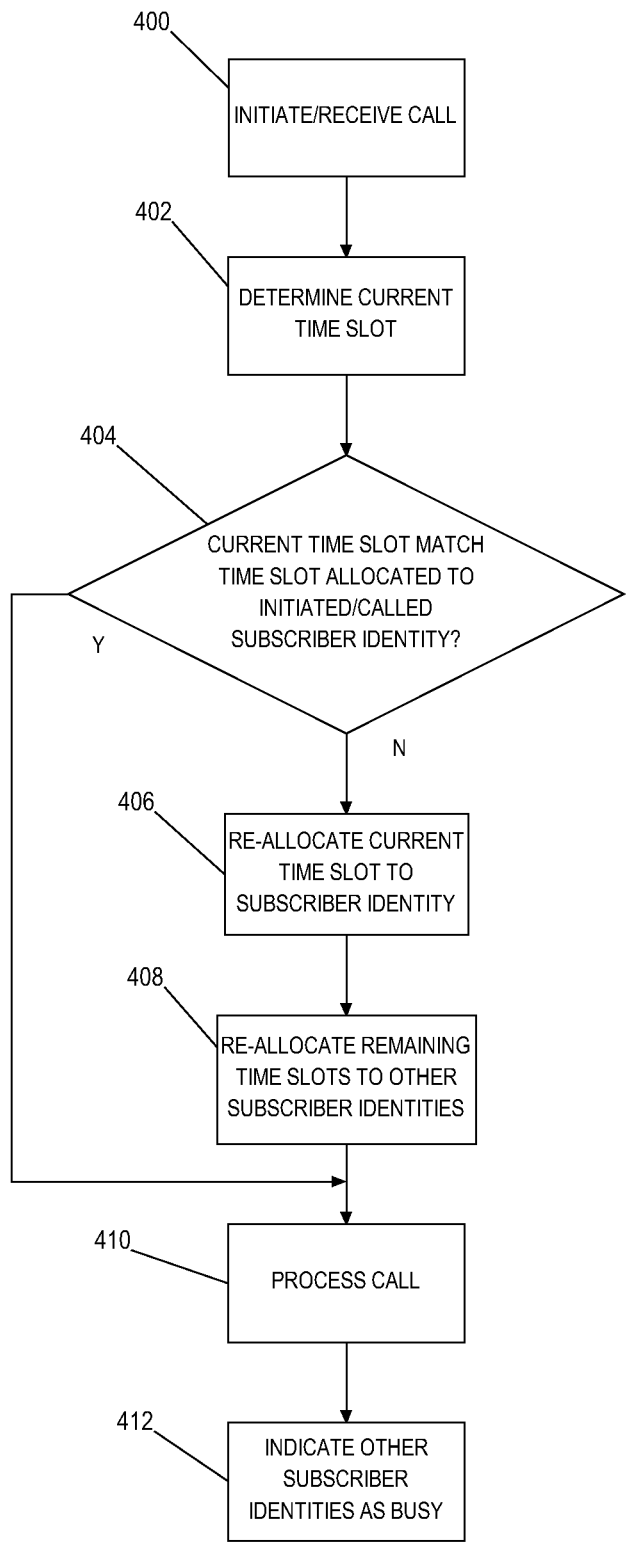
FIG. 4 is a flow diagram illustrating another embodiment of a method for enabling wireless communications for multiple subscriber identities using a single transceiver.

FIG. 4 is a flow diagram illustrating an embodiment of a method for enabling wireless communications for multiple subscriber identities via a single transceiver. The method begins at block 400, where a call is initiated and/or received for a particular subscriber identity on terminal device 100. At block 402, multi-subscriber identity logic 260 determines the current internal communications channel time slot. At decisional block 404, a determination is made whether the current time slot corresponds to the time slot allocated for the indicated subscriber identity. If so, the method proceeds to block 410. If not, the method proceeds to block 406, where multi-subscriber identity logic 260 re-allocates the current time slot to the indicated subscriber identity. At block 408, multi-subscriber identity logic 260 re-allocates the remaining time slots to the other subscriber identities of terminal device 100. At block 410, multi-subscriber identity logic 260 causes the call to be processed. At block 412, multi-subscriber identity logic 260 causes other subscriber identities to be indicated as being busy in response to receiving another call for such other subscriber identity. The method then ends.

Thus, embodiments of the present disclosure enable wireless communications for a terminal device supporting multiple numbers or subscriber identities (e.g., multiple SIMs) using a single transceiver on the terminal device. Embodiments of the present disclosure divide an internal communication channel of the terminal device into a plurality of different time slots to enable different time slots to be utilized by respectively different subscriber identities.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    determining a quantity of subscriber identities supported by a terminal device, the terminal device including a transceiver for wireless communications;
    responsive to determining that the terminal device supports a plurality of subscriber identities, dividing internal receiver and transmitter communication channels of the terminal device into a corresponding quantity of recurrent time slots;
    allocating for each subscriber identity a respective time slot; and
    enabling wireless communications for the plurality of subscriber identities using the respective time slots via the transceiver.

2. The method of claim 1, further comprising:
    identifying a frequency band corresponding to each subscriber identity; and
    instructing the transceiver to listen to the frequency band corresponding to each subscriber identity during the time slot allocated to the respective subscriber identity.

3. The method of claim 1, further comprising:
    identifying a frequency band corresponding to each subscriber identity; and
    instructing the transceiver to transmit a signal strength to a base station server for each subscriber identity during the time slot allocated to the respective subscriber identity.

4. The method of claim 1, further comprising:
    receiving a system identification code (SID) for each subscriber identity;
    comparing the received SID with a SID programmed for the respective subscriber identities; and
    responsive to determining that the received SID matches the programmed SID, transmitting a registration request to a base station server for the subscriber identities during the time slot allocated to the respective subscriber identity.

5. The method of claim 1, further comprising, responsive to determining that communications corresponding to at least one subscriber identity are idle for a predefined time period, transmitting a keep-alive signal to a base station server for the at least one subscriber identity during the time slot allocated to the at least one subscriber identity.

6. The method of claim 1, further comprising, responsive to receiving a communication on a data channel from a base station server corresponding to one of the subscriber identities, responding with a busy signal for another communication on a data channel for another subscriber identity of the terminal device.

7. The method of claim 1, further comprising:
    responsive to receiving a communication on a data channel from a base station server corresponding to one of the subscriber identities, determining a current time slot of the terminal device; and
    responsive to determining that the current time slot differs from the time slot allotted to the one subscriber identity, reallocating the one subscriber identity to the current time slot.

8. The method of claim 7, further comprising reallocating the remaining subscriber identities among the remaining time slots of the terminal device.

9. The method of claim 1, further comprising:
    responsive to initiating a communication on a data channel from the terminal device corresponding to one of the subscriber identities, determining a current time slot of the terminal device; and
    responsive to determining that the current time slot differs from the time slot allotted to the one subscriber identity, reallocating the one subscriber identity to the current time slot.

10. A method comprising:
    retrieving information for each of a plurality of subscriber identities defined in a terminal device, the terminal device including a transceiver for wireless communications;
    dividing internal receiver and transmitter communication channels of the terminal device into a quantity of recurrent time slots corresponding to the plurality of subscriber identities;
    allocating for each subscriber identity a respective time slot; and
    enabling wireless communications for the plurality of subscriber identities using the respective time slots via the transceiver.

11. The method of claim 10, wherein creating the plurality of recurrent time slots comprises creating a quantity of recurrent time slots corresponding to a quantity of subscriber identities defined in the terminal device.

12. The method of claim 10, further comprising:

identifying a frequency band corresponding to each subscriber identity; and instructing the transceiver to listen to the frequency band corresponding to each subscriber identity during the time slot allocated to the respective subscriber identity.

13. The method of claim 12, further comprising:

identifying a frequency band corresponding to each subscriber identity; and instructing the transceiver to transmit a signal strength to a base station server for each subscriber identity during the time slot allocated to the respective subscriber identity.

14. A method comprising:

determining whether a terminal device supports a plurality of subscriber identities, the terminal device including a transceiver for wireless communications;

responsive to determining that the terminal device supports a plurality of subscriber identities, creating a plurality of recurrent time slots for a communication channel of the terminal device;

allocating for each subscriber identity a respective time slot;

enabling wireless communications for the plurality of subscriber identities using the respective time slots via the transceiver;

receiving a system identification code (SID) for each subscriber identity;

comparing the received SID with a SID programmed for the respective subscriber identities; and responsive to determining that the received SID matches the programmed SID, transmitting a registration request to a base station server for the subscriber identities during the time slot allocated to the respective subscriber identity.

\* \* \* \* \*